United States Patent
Wilkie (10) Patent No.: US 10,325,738 B2
(45) Date of Patent: Jun. 18, 2019

(54) GAS-INSULATED SWITCHGEAR WITH SEALED OPERATING MECHANISMS

(71) Applicant: Eaton Corporation, Cleveland, OH (US)

(72) Inventor: William Edward Wilkie, Fletcher, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/728,766

(22) Filed: Oct. 10, 2017

(65) Prior Publication Data
US 2019/0108955 A1    Apr. 11, 2019

(51) Int. Cl.
*H01H 33/666* (2006.01)
*H01H 33/662* (2006.01)

(52) U.S. Cl.
CPC ........ *H01H 33/666* (2013.01); *H01H 33/662* (2013.01)

(58) Field of Classification Search
CPC ............... H01H 33/666; H01H 33/662; H01H 33/66238; H01H 2033/66246; H01H 50/60; H01H 50/641; H01H 47/22; H01H 9/08; H02B 13/0352; H02B 13/045; H02B 5/06; H02B 7/01
USPC ....... 218/140, 139, 134, 120, 135, 153–155; 200/153 G
See application file for complete search history.

(56) References Cited

U.S. PATENT DOCUMENTS

| | | | | |
|---|---|---|---|---|
| 3,350,528 A | * | 10/1967 | McKeough | H01H 3/52 218/78 |
| 4,168,414 A | * | 9/1979 | Kumbera | H01H 33/666 200/318 |
| 5,191,180 A | | 3/1993 | Kitamura et al. | |
| 6,510,046 B2 | | 1/2003 | Arioka et al. | |
| 7,158,369 B2 | | 1/2007 | Lammers | |
| 7,193,172 B2 | | 3/2007 | Rokunohe et al. | |
| 8,895,884 B2 | * | 11/2014 | Yamamoto | H01H 33/42 218/140 |
| 9,208,978 B2 | * | 12/2015 | Yano | H01H 33/38 |
| 9,215,825 B2 | * | 12/2015 | Sano | H02B 13/0356 |

(Continued)

FOREIGN PATENT DOCUMENTS

JP    2003319515    * 11/2003  ............. H02B 13/02

OTHER PUBLICATIONS

Translation JP2003-319515(original doc. published Nov. 7, 2003).*

(Continued)

*Primary Examiner* — Edwin A. Leon
*Assistant Examiner* — William A Bolton
(74) *Attorney, Agent, or Firm* — Stanek Lemon Crouse & Meeks (57) ABSTRACT

A switchgear unit includes a gas-insulated compartment and a circuit interrupter in the gas-insulated compartment and mounted on a wall thereof, the circuit interrupter having an actuator rod extending through the wall and outside of gas-insulated compartment. The switchgear unit further includes a sealed operating mechanism compartment adjacent the gas-insulated compartment and having an operating mechanism therein that engages the actuator rod. The circuit interrupter may be included in a vacuum circuit interrupter assembly having a base mounted to the wall and including a bellows through which the actuator rod passes.

15 Claims, 5 Drawing Sheets

(56) References Cited

U.S. PATENT DOCUMENTS

2012/0160810 A1* 6/2012 Ohtsuka ............. H02B 13/0354
                                                            218/140
2014/0042125 A1* 2/2014 Matsunaga ........ H02B 13/0354
                                                            218/139

OTHER PUBLICATIONS

"ZX-Family Gas-insulated medium voltage switchgear," 2009, ABB AG, Calor Emag Medium Voltage Products, Ratingen, Germany, 6 pages.
"Medium Voltage Distribution, GM6 MV Gas Insulated Switchgear up to 36 kV," Schneider Electric S.p.A., Stezzano, Belgium, Mar. 28, 2008, 25 pages.
"Gas Insulated Ring Main Unit, RVAC Professional solutions, Reliable power," Eaton Corporation, Shanghai, China, 2016, 20 pages.
"12kV-24kV New Compact Gas Insulated Ring Main Unit, Leading the future of electrification," SecoRMU, GE Industrial Solutions, 2013, 63 pages.

* cited by examiner

GAS-INSULATED SWITCHGEAR WITH SEALED OPERATING MECHANISMS

BACKGROUND

The inventive subject matter relates to electrical apparatus and, more particularly, to switchgear.

In typical gas-insulated switchgear (GIS), certain higher voltage components that are prone to arc generation, such as circuit interrupters, switches and the like, are placed in closed structures filled with an insulating high-dielectric gas, such as sulfur hexafluoride ($SF_6$). The insulation properties of the gas allow reduced spacing between components and thus enable relatively compact arrangement of the switchgear components. While high-voltage (e.g., 50 kV and above) switchgear is commonly gas-insulated, medium-voltage circuit breakers and other medium-voltage devices may also utilize gas insulated switching components. Potential advantages of GIS include compact form factors and low maintenance in comparison compared to air-insulated switchgear.

SUMMARY OF THE INVENTION

Some embodiments of the inventive subject matter provide a switchgear unit including a first sealed compartment configured to contain a dielectric gas and a circuit interrupter in the first sealed compartment and having an actuator member accessible from outside of the first sealed compartment. The switchgear unit further comprises a second sealed compartment adjacent the first sealed compartment and an operating mechanism in the second sealed compartment and operatively coupled to the actuator member of the circuit interrupter.

In some embodiments, the actuator member may extend through a wall of the first sealed compartment, e.g., the actuator member may pass through a bellows mounted adjacent the wall. In some embodiments, the actuator member may pass into the second sealed compartment to engage the operating mechanism. In some embodiments, the actuator member may be mechanically coupled to the operating mechanism at a location outside of the first and second sealed compartments.

In some embodiments, the circuit interrupter comprises a vacuum circuit interrupter assembly, which may be, for example, a pole unit having a vacuum circuit interrupter contained therein. The vacuum circuit interrupter assembly may be mounted on a wall of the first sealed compartment and the actuator member may include a rod passing through the wall and through a bellows of the vacuum circuit interrupter assembly.

In further embodiments, the first sealed compartment may include an enclosure with an opening configured to enable insertion of the vacuum circuit interrupter assembly into the enclosure. The wall may include a removable plate on which the circuit interrupter assembly is mounted and that is configured to cover the opening when the vacuum circuit interrupter assembly is installed in the enclosure.

In still further embodiments, the operating mechanism may include a mechanical linkage member, such as a linkage member for actuating or charging the operating mechanism, that is accessible from outside of the second sealed compartment. The mechanical linkage member may extend through a wall of the second sealed compartment. For example, the mechanical linkage member may include a rod passing through a bellows at a wall of the second sealed compartment.

In some embodiments, the second sealed compartment may contain a dielectric gas or a low reactivity gas. The switchgear unit may further include a switchgear housing that contains the first and second sealed compartments.

According to further embodiments of the inventive subject matter, a switchgear unit includes a gas-insulated compartment and a circuit interrupter in the gas-insulated compartment and mounted on a wall thereof, the circuit interrupter having an actuator rod extending through the wall and outside of gas-insulated compartment. The switchgear unit further includes a sealed operating mechanism compartment adjacent the gas-insulated compartment and having an operating mechanism therein that engages the actuator rod. The circuit interrupter may be included in a vacuum circuit interrupter assembly having a base mounted to the wall and including a bellows through which the actuator rod passes.

In some embodiments, the actuator rod may extend into the sealed operating mechanism compartment. In some embodiments, the operating mechanism may include an actuator rod extending through a wall of the sealed operating mechanism compartment and coupled to the actuator rod of the circuit interrupter. The operating mechanism may include a mechanical linkage accessible from outside of the sealed operating mechanism compartment.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As used herein and in keeping with terminology commonly used in the electrical switchgear industry, "gas-insulated" refers to insulation using a relatively high dielectric gas (e.g., a pure gas or gas mixture) that has a different composition than ambient air and thus provides enhanced insulation with respect to ambient air. The insulation gas used in a gas-insulated switchgear component may include, for example, a high-dielectric halogenated gas, such as sulfur hexafluoride ($SF_6$) and/or alternatives thereto, such as fluorinated gas (e.g., fluoroketone-based) mixtures, non-reactive nitrogen (dinitrogen gas) and dry air. It will be appreciated that the composition of such an insulation gas may be maintained, for example, by containment of the insulation gas within a sealed compartment and/or control of the gas composition using an active control system.

Some embodiments of the inventive subject matter arise from a realization that, while gas-insulated switchgear can be relatively low maintenance in comparison to air-insulated switchgear, operating mechanisms for gas-insulated switchgear are typically exposed to air (e.g., mounted in a front portion of the switchgear that is open to the ambient environment), and can thus be vulnerable to contamination. Consequently, these operating mechanisms may be more failure-prone than the gas-insulated components and may require more frequent inspection and maintenance, which can undermine the goal of providing a low-maintenance switchgear unit.

According to some embodiments, reduced maintenance requirements may be provided by a gas-insulated switchgear unit that houses switching devices, such as circuit interrupters and disconnect switches, in a gas-insulated compartment. Operating mechanisms for these components may be housed separately in one or more sealed mechanism compartments. The mechanism compartments may be filled with a dielectric gas, may be filled with an inert gas (e.g., argon gas) or a non-oxidizing gas (e.g., dinitrogen gas), or may be maintained in sealed compartment with a controlled air atmosphere. This can reduce inspection and maintenance requirements for the operating mechanisms and allow them to be accessed separately from gas-insulated components that may require less inspection and maintenance. Interfaces between the gas-insulated and the sealed mechanism compartments may be limited, for example, to sealed mechanical linkages, while interfaces between the ambient environment and the sealed mechanism compartment may be limited to sealed mechanical linkages and electrical connections.

Figure 1:
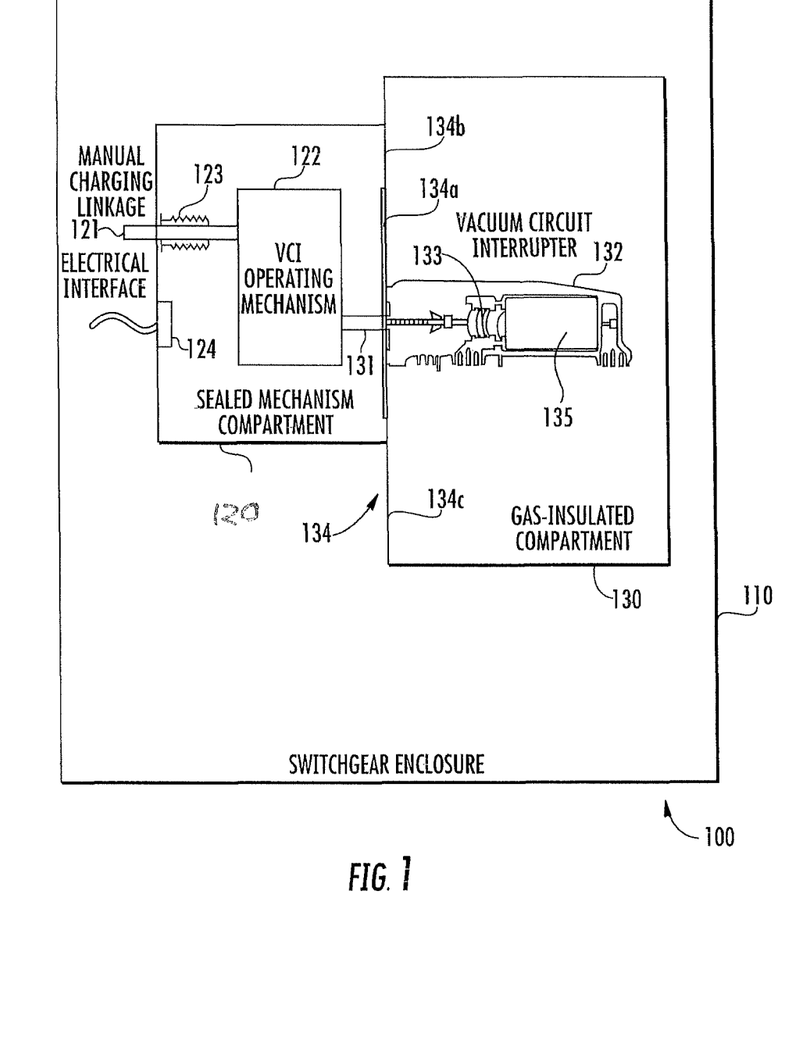
FIG. 1 illustrates a switchgear unit with a sealed operating mechanism for a vacuum circuit interrupter according to some embodiments of the inventive subject matter.

FIG. 1 illustrates a cross-sectional view of a switchgear unit 100 according to some embodiments of the inventive subject matter. The switchgear unit 100 includes a switchgear housing 110 that houses a gas-insulated compartment 130, which may be, for example, a pressurized compartment or tank filled with a dielectric gas, such as $SF_6$ and/or alternatives thereto. Vacuum circuit interrupter pole units 132 are disposed in the gas-insulated switch compartment 130. Each of the pole units 132 includes a vacuum circuit interrupter 135, which may be encapsulated in an epoxy resin or similar material, and which has an actuator rod 131 extending therefrom through a bellows 133 that maintains a vacuum seal for the vacuum circuit interrupter 135 while the actuator rod 131 moves in a linear fashion to open and close contacts within the vacuum circuit interrupter 135. As illustrated, each pole unit 132 is mounted on a wall 134 of the gas-insulated switch compartment 130 such that the actuator rod 131 extends through the wall 134.

It will be appreciated that the vacuum circuit interrupter arrangement illustrated is an example, and that other arrangements may be used, such as arrangements that include vacuum circuit interrupters that are not encapsulated in pole units as shown or arrangements using other types of circuit interrupters than vacuum circuit interrupters. In further embodiments, rather than being mounted on a wall of a gas-insulated compartment, a circuit interrupter assembly (for example, a pole unit such as the pole unit 132) may be mounted on a bracket or other support structure internal to the gas-insulated compartment, with actuator linkage for such a circuit interrupter arrangement passing from the internally-mounted pole unit or other circuit interrupter assembly to an operating mechanism external to the gas-insulated compartment through bellows or other sealing mechanisms.

The sealed mechanism compartment 120 houses a vacuum circuit interrupter (VCI) operating mechanism 122 that is mechanically coupled to the actuator rod 131. The operating mechanism 122 may be configured to linearly actuate the actuator rod 131 of the vacuum circuit interrupter 135 to open and close contacts therein. It will be appreciated that this mechanical linkage is an example provided for purposes of illustration, and that other linkage arrangements may be used, such as a linkage that uses a rotational interaction via a sealed bushing in the wall 134, rather than the reciprocating action described.

The operating mechanism 122 may include, for example, an energy storage system that stores energy for actuation of the vacuum circuit interrupter 135. In some embodiments, the energy storage system may be a spring-loaded energy storage mechanism, which may include, for example, a charging motor (not shown) that is configured to charge one or more spring mechanisms that store mechanical energy to drive the vacuum circuit interrupter 135.

The mechanism 122 may further include a manual charging linkage member (e.g., a rod, lever, or the like), that may be manually actuated to charge the spring-loaded energy storage system. For example, as shown, a rod 121 may extend from the operating mechanism 122 and may be configured to engage with a pivoting lever or similar mechanism that may be used to pump the rod 121 in a reciprocating manner to charge the spring-loaded energy storage device of the mechanism 122. The charging rod 121 may extend through a wall of the sealed mechanism compartment 120 via a bellows 123, thus maintaining the sealed environment for the operating mechanism 122. It will be appreciated that that the charging linkage described above is an example, and that other charging linkage arrangements, such as one using a rotational coupling through a sealed bushing in a wall of the sealed mechanism compartment 120, may be used.

It will be further appreciated that the charging linkage shown is just an example of the type of external mechanical linkages that may be provided to the operating mechanism 122 in the sealed compartment 120, and that other mechanical interfaces may be provided in similar manner. For example, external buttons, levers or other user input devices may be provided for actuating the operating mechanism 122 so that the vacuum circuit interrupter 135 may be manually opened or closed. Such user input devices may be linked to the operating mechanism 122 using rods or other mechanical linkages that pass through a wall of the sealed mechanism compartment 120 in a sealed manner (e.g., via bellows, bushings or the like), similar to the charging linkage described above. As further shown, a sealed electrical interface 124 may also be provided for electrical power transfer and control communications for the operating mechanism 122. The electrical interface 124 may be used, for example, to convey power and control signals to and/or from a charging motor and other components of the operating mechanism 122.

In some embodiments, the sealed mechanism compartment 120 may be configured to maintain an environmental seal that isolates the operating mechanism 122 and other components within the compartment 120 from an external ambient environment. For example, the sealed mechanism compartment 120 may be a pressurized vessel configured to contain a non-air gas, such as a dielectric gas (e.g., sulfur hexafluoride) or an inert or non-oxidizing gas (e.g., argon or dinitrogen gas). In further embodiments, the sealed mechanism compartment 120 may contain an air atmosphere that is controlled for humidity, purity or other characteristics using an environmental control system (e.g., a system using filters, dessicants, and the like).

Figure 2:
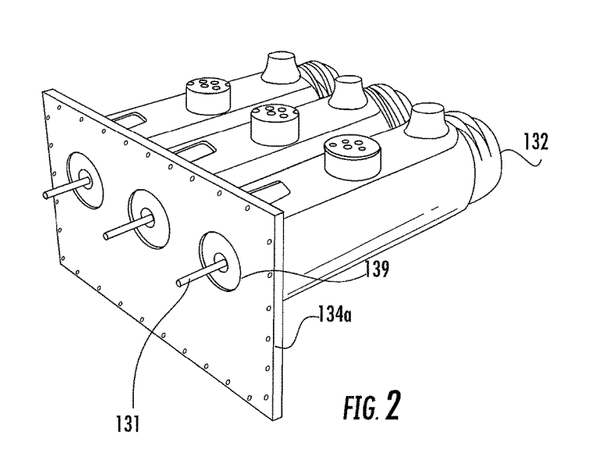
FIGS. 2 and 3 are perspective views of vacuum circuit interrupter assemblies according to further embodiments.
Figure 3:
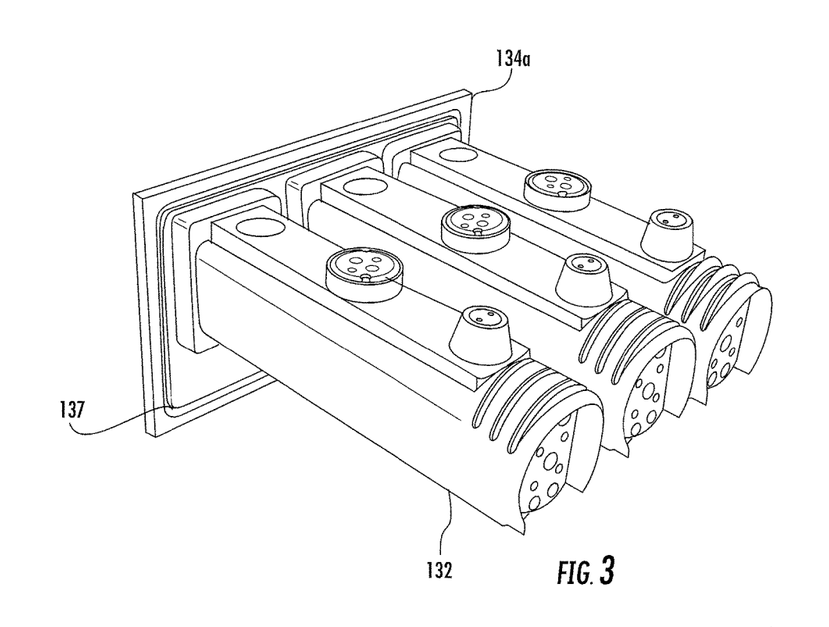

Referring to FIGS. 1-3, the wall 134 may include a removable plate 134a that can be used to provide access to components within the gas-insulated compartment 130. The pole units 132 may be mounted on the plate 134a, such that removal of the plate 134a may extract the pole units 132 from the gas-insulated compartment 130. Referring to FIGS. 2 and 3, the plate 134 may have a groove 137 therein configured to retain a gasket that mates with other portions 134b, 134c of the wall 134 to maintain the sealed environment of the gas-insulated compartment 130. Respective actuator rods 131 for the respective pole units 132 may extend through the plate 134a through bushings 139.

It will be appreciated that other embodiments may use different arrangements than that shown in FIGS. 1-3. For example, although FIG. 1 illustrates a gas-insulated compartment 130 and a sealed operating mechanism compartment 120 contained within a single unit enclosure 110, other embodiments may provide these compartments in separate units. As discussed below, gas-insulated components, such as other types of switching devices, may also be provided with operating mechanisms that are contained in one or more sealed mechanism compartments along the lines discusses above. In some embodiments, rather than mounting circuit interrupters on a removable plate as shown in FIGS. 1-3, circuit interrupter assemblies may be installed within a gas-insulated compartment (e.g., on a wall of the compartment and/or on a support structure within the compartment) via an opening which is later closed by installing a cover or plate that is welded in place to seal the compartment.

Figure 4:
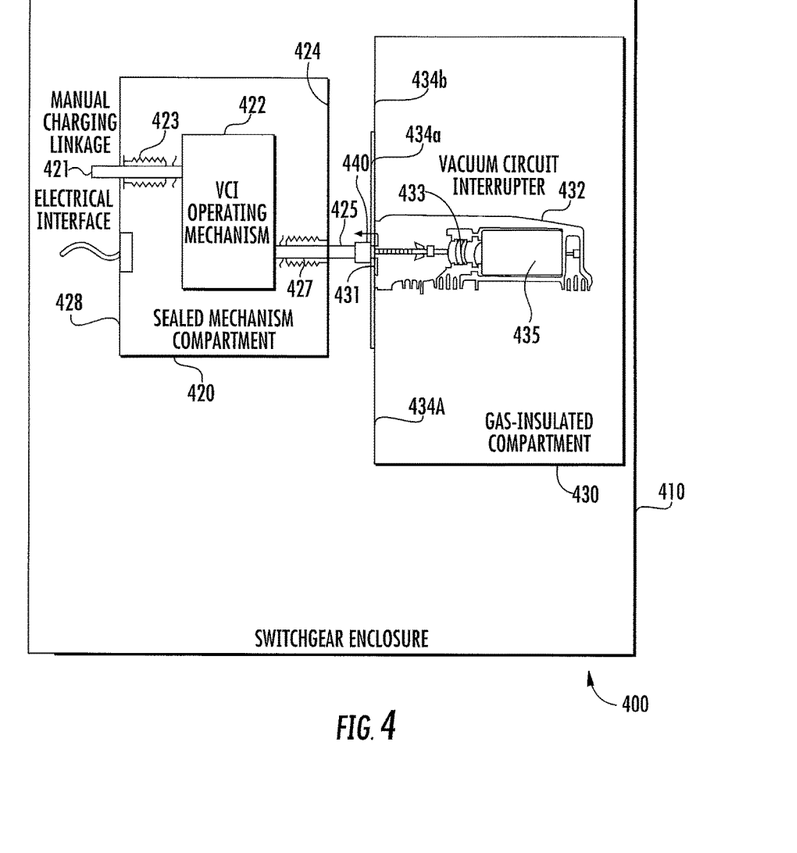
FIG. 4 illustrates a switchgear unit with sealed operating mechanisms for a vacuum circuit interrupter and a disconnect switch according to additional embodiments.

In some embodiments, a gas-insulated switch compartment and a sealed operating mechanism compartment may not be directly abutting one another as shown in FIG. 1, and instead may have actuator members extending therefrom that may be interconnected by couplers or other mechanical linkages. For example, FIG. 4 illustrates a switchgear unit 400 that includes a switchgear housing 410 that houses a gas-insulated compartment 430 and sealed operating mechanism compartment 420. A sealed vacuum circuit interrupter pole unit 432 is mounted in the gas-insulated compartment 430 and includes a vacuum circuit interrupter 435. An actuator rod 431 for the vacuum circuit interrupter 435 extends from the pole unit 432 and through a wall 434 of the gas-insulated compartment 430. As shown, the pole unit 432 may be mounted on a removable plate 434a that is configured to removable mate with wall portions 434b, 434c, along lines described above.

The switchgear housing 410 also houses a sealed operating mechanism compartment 420 displaced from the gas-insulated compartment 430. The sealed mechanism compartment 420 contains an operating mechanism 422 which is mechanically coupled to the actuator rod 431. As shown, the operating mechanism 422 may include an actuator rod 425 that extends through a bellows 427 and wall 429 of the sealed mechanism compartment 420. The actuator rod 425 may be coupled to the actuator rod 431 of the vacuum circuit interrupter 135 via, for example, a coupling 440. The mechanism 422 may include, for example, a spring-loaded energy storage system that stores mechanical energy that is used for actuation of the vacuum circuit interrupter 435, along the lines discussed above with reference to FIG. 1. The mechanism 422 may include a member that links the mechanism 422 to an external user input device, such as a manual charging linkage member (e.g., a rod, lever, or the like) that may be manually actuated to charge the spring-loaded energy storage system. For example, as shown, a charging rod 421 may extend from the operating mechanism 422 and through a bellows 423 and a wall 428 of the sealed mechanism compartment 420, and may be configured to engage with a lever or similar mechanism that may be used to actuate the rod 421 in a reciprocating manner to charge the spring-loaded energy storage device of the mechanism 422. As further shown, a sealed electrical interface 424 may provide electrical power transfer and control communications for the operating mechanism 422.

Figure 5:
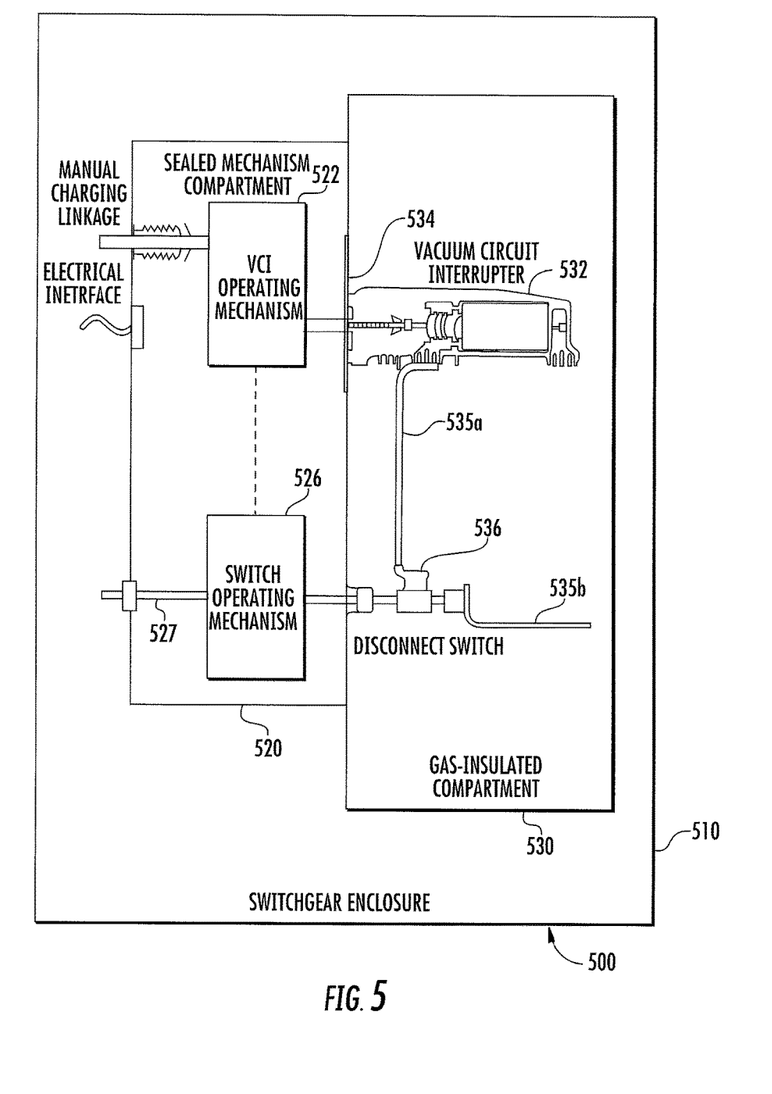
FIGS. 5 and 6 illustrate switchgear units with separate sealed operating mechanisms for a vacuum circuit interrupter and a disconnect switch according to additional embodiments.

According to further embodiments, similarly sealed operating mechanisms may be used for other gas-insulated switchgear components. FIG. 5 illustrates a switchgear unit 500 that includes a gas-insulated compartment 530 and a sealed mechanism compartment 520 housed within a switchgear housing 510. The gas-insulated compartment 530 may include a vacuum circuit interrupter pole unit 532 that is actuated by an operating mechanism 522 in the sealed mechanism compartment 520, along lines discussed above with reference to FIG. 1. A bus section 535a connects the pole unit 532 to a disconnect switch 536, which is also housed in the gas-insulated compartment 530. The disconnect switch 536 is configured to couple and decouple the bus section 535a to and from another bus section 535b, and is configured to be actuated by a second operating mechanism 526, which is housed in the sealed mechanism compartment 520. For example, the disconnect switch 536 may have an actuator rod 537 that passes through a wall 534 of the gas-insulated compartment 530 (e.g., through a sealed bushing) and into the sealed mechanism compartment 520, where it is engaged by the operating mechanism 526.

Figure 6:
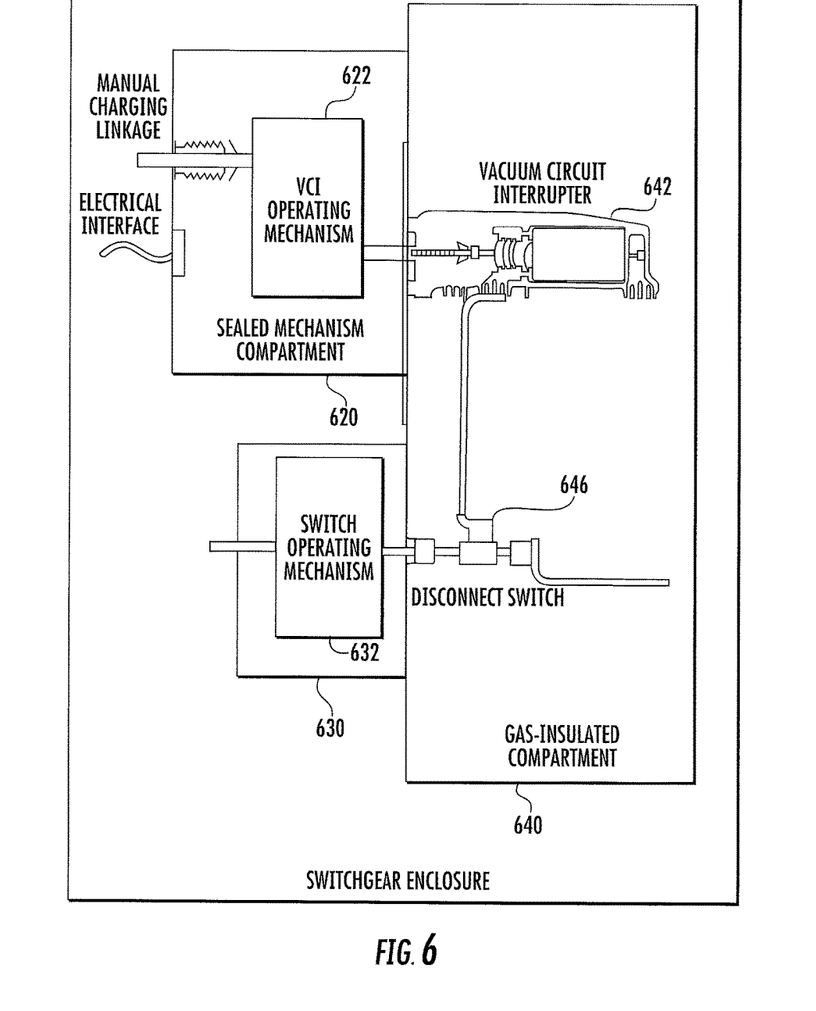

The switch operating mechanism may further include control linkage 527 accessible from outside of the sealed mechanism compartment 520 to facilitate operation of the switch 536 by an operator external to the sealed mechanism compartment 520. As shown in dotted line, interlock linkage may also be provided between the circuit interrupter operating mechanism 522 and the switch operating mechanism 526 to prevent inappropriate operation of the switch 536. As illustrated in FIG. 6, separate sealed compartments 630, 630 may be provided for respective operating mechanisms 622, 632 for a vacuum circuit interrupter pole unit 642 and a disconnect switch 646 housed in a gas-insulated compartment 640.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A switchgear unit comprising:
 a first sealed compartment configured to contain a dielectric gas;
 a circuit interrupter in the first sealed compartment and having an actuator member accessible from outside of the first sealed compartment;
 a second sealed compartment adjacent the first sealed compartment; and
 an operating mechanism in the second sealed compartment and operatively coupled to the actuator member of the circuit interrupter, the operating mechanism comprising an energy storage mechanism and a mechanical linkage member accessible from outside of the second sealed compartment and configured to charge the energy storage mechanism, wherein the mechanical linkage member comprises a rod passing through a bellows at a wall of the second sealed compartment.

2. The switchgear unit of claim 1, wherein the actuator member extends through a wall of the first sealed compartment.

3. The switchgear unit of claim 2, wherein the actuator member passes through a bellows mounted adjacent the wall.

4. The switchgear unit of claim 2, wherein the actuator member passes into the second sealed compartment to engage the operating mechanism.

5. The switchgear unit of claim 1, wherein the circuit interrupter comprises a vacuum circuit interrupter assembly.

6. The switchgear unit of claim 5, wherein the vacuum circuit interrupter assembly is mounted on a wall of the first sealed compartment and wherein the actuator member comprises a rod passing through the wall and through a bellows of the vacuum circuit interrupter assembly.

7. The switchgear unit of claim 6, wherein the first sealed compartment comprises an enclosure with an opening configured to enable insertion of the vacuum circuit interrupter assembly into the enclosure and wherein the wall comprises a removable plate on which the circuit interrupter assembly is mounted and that is configured to cover the opening when the vacuum circuit interrupter assembly is installed in the enclosure.

8. The switchgear unit of claim 1, wherein the second sealed compartment contains a dielectric gas, an inert gas or a non-oxidizing gas.

9. The switchgear unit of claim 1, further comprising a switchgear housing that contains the first and second sealed compartments.

10. A switchgear unit comprising:
 a gas-insulated compartment;
 a circuit interrupter in the gas-insulated compartment and mounted on a wall thereof, the circuit interrupter having an actuator rod extending through the wall and outside of gas-insulated compartment; and
 a sealed operating mechanism compartment adjacent the gas-insulated compartment and having an operating mechanism therein that engages the actuator rod, wherein the operating mechanism comprises an energy storage mechanism and a mechanical linkage member extending through a wall of the sealed operating mechanism compartment and configured to charge the energy storage mechanism and wherein the mechanical linkage member comprises a rod passing through a bellows at the wall of the sealed operating mechanism compartment.

11. The switchgear unit of claim 10, wherein the circuit interrupter comprises a vacuum circuit interrupter assembly having a base mounted to the wall, the vacuum circuit interrupter assembly further comprising a bellows through which the actuator rod passes.

12. The switchgear unit of claim 10, wherein the actuator rod extends into the sealed operating mechanism compartment.

13. The switchgear unit of claim 10, wherein the operating mechanism comprises an actuator rod extending through a wall of the sealed operating mechanism compartment and coupled to the actuator rod of the circuit interrupter.

14. The switchgear unit of claim 10, further comprising a switchgear housing that contains the gas-insulated compartment and the sealed operating mechanism compartment.

15. The switchgear of claim 10, wherein the sealed operating mechanism compartment is filled with a dielectric gas, and inert gas or a non-oxidizing gas.

* * * * *